US010713579B2

(12) United States Patent
Ahmed et al.

(10) Patent No.: US 10,713,579 B2
(45) Date of Patent: Jul. 14, 2020

(54) WEIGHTED SIMILARITY ESTIMATION IN DATA STREAMS WITH APPLICATIONS TO COLLABORATIVE FILTERING AND VIRAL MARKETING

(71) Applicant: NEC Europe Ltd., Heidelberg (DE)

(72) Inventors: Mohamed Ahmed, Heidelberg (DE); Konstantin Kutzkov, Heidelberg (DE); Sofia Nikitaki, Darmstadt (DE)

(73) Assignee: NEC CORPORATION, Tokyo (JP)

( * ) Notice: Subject to any disclaimer, the term of this patent is extended or adjusted under 35 U.S.C. 154(b) by 1404 days.

(21) Appl. No.: 14/795,977

(22) Filed: Jul. 10, 2015

(65) Prior Publication Data

US 2017/0011296 A1  Jan. 12, 2017

Related U.S. Application Data

(60) Provisional application No. 62/158,638, filed on May 8, 2015.

(51) Int. Cl.
  *G06N 7/00*   (2006.01)
  *G06Q 30/02*   (2012.01)
  *G06Q 30/06*   (2012.01)
  *G06Q 10/10*   (2012.01)
  *G06Q 50/00*   (2012.01)

(52) U.S. Cl.
  CPC .......... *G06N 7/005* (2013.01); *G06Q 10/101* (2013.01); *G06Q 30/0201* (2013.01); *G06Q 30/0251* (2013.01); *G06Q 30/0631* (2013.01); *G06Q 50/01* (2013.01)

(58) Field of Classification Search
  CPC ..... G06N 5/022; G06N 7/00; G06F 16/24568
  See application file for complete search history.

(56) References Cited

U.S. PATENT DOCUMENTS

| | | | |
|---|---|---|---|
| 2010/0023506 A1* | 1/2010 | Sahni ............... | G06F 17/30867 707/E17.014 |
| 2011/0231405 A1* | 9/2011 | Herbrich ........... | G06F 16/24573 707/748 |
| 2014/0280251 A1* | 9/2014 | Somekh ............. | G06F 16/9535 707/754 |

(Continued)

OTHER PUBLICATIONS

Lv, Qin, Moses Charikar, and Kai Li. "Image similarity search with compact data structures." Proceedings of the thirteenth ACM international conferen (Year: 2004).*

(Continued)

*Primary Examiner* — Vincent Gonzales
*Assistant Examiner* — Kevin W Figueroa
(74) *Attorney, Agent, or Firm* — Leydig, Voit & Mayer, Ltd.

(57) ABSTRACT

A method estimates similarities in data streams. A data source receives input vectors from users. A sketch feature generator converts the input vectors into sketch feature vectors corresponding to the users, wherein each sketch feature vector represents data and meta-information from each user received in a most recent sample period. A similarity comparator compares each sketch feature vector against other sketch feature vectors to calculate similarity probabilities between the users. A processor running a decision loop determines a prediction result for at least one user based on the similarity probabilities.

19 Claims, 3 Drawing Sheets

(56) References Cited

U.S. PATENT DOCUMENTS

2015/0220530 A1* 8/2015 Banadaki .......... G06F 17/30943
707/723

OTHER PUBLICATIONS

N. Alon, Y. Matias, M. Szegedy, The Space Complexity of Approximating the Frequency Moments, J. Comput. Syst. Sci 58(1), pp. 137-147, Dec. 1999.
A.Z. Broder, M. Charikar, A. M. Frieze, M. Mitzenmacher, „Min-Wise Independant Permutations, STOC, Dec. 1998, pp. 327-336.
W. Chen, C. Wang and Y. Wang, „scalable influence maximization for prevalent viral marketing in large-scale social networks, KDD, Dec. 2010, pp. 1029-1038.
A. Goyal, F. Bonchi, L. V. S Lakshmanan, Learning influence probabilities in social networks, WSDM, Dec. 2010, pp. 241-250.
M. Jamali, G. Haffari, M. Ester, „Modeling the temporal dynamics of social rating networks using bidirectional effects of social relations and rating patterns, WWW, Dec. 2011, pp. 527-536.
M. Jamali, M. Ester, "TrustWalker: a random walk model for combining trust-based and item-based recommendation", KDD, Dec. 2009, pp. 397-406.
D. Kempe, J. M. Kleinberg, E. Tardos, „Maximizing the spread of incluence through a social network, KDD, Dec. 2003, pp. 137-146.
K. Kutzkov, A. Bifet, F. Bonchi, A. Gionis, „STRIP: stream learning of influence probabilities, KDD, Dec. 2013: 275-283.
Yoram Bachrach, Ralf Herbrich, "Fingerprinting Ratings for Collaborative Filtering—Theoretical and Empirical Analysis", String Processing and Information Retrieval, vol. 6393 of the series Lecture Notes in Computer Science, pp. 25-36, Oct. 11-13, 2010.

\* cited by examiner (a) Cosine similarity.

(b) Pearson correlation

Fig. 2

ProcessStream
Input: stream of user-rating-timestamp triples $S$, pairwise independent function $h : \mathbb{N} \to [k]$ 1: for each $(u, r_{u,i}, t_{u,i}) \in S$ do
2:   Let $c = (c_1, \ldots, c_{r_{max}})$ such that $c_\ell = 1$ for $1 \leq \ell \leq r_{u,i}$ and $c_\ell = 0$ for $r_{u,i} + 1 \leq \ell \leq r_{max}$.
3:   for $j = 1$ to $r_{u,i}$ do
4:     STRIPUpdate$(u, i, t_{u,i}, j, h)$
5:   $N[u] \mathrel{+}= r_{u,i}^2$
6:   $S[u] \mathrel{+}= r_{u,i}$
7:   $C[u] \mathrel{+}= 1$ STRIPUpdate
Input: user $u$, item $i$, timestamp $t_{u,i}$, sample number $j$, pairwise independent hash function $h : \mathcal{I} \to [0, 1]$.

1: if $h(i) < H_u^j.\text{getMax}()$ then
2:   $H_u^j.\text{pop}()$
3:   $H_u^j.\text{add}(h(i), t_{u,i})$ MinWiseEstimate
Input: sketches $H_u^k, H_v^\ell$, constraints $\Omega$ 1: Let $\text{Min}_s$ be the $s$ pairs $(u, t_{u,i})$ with the smallest hash value in $H_u^k \cup H_v^\ell$
2: return $\frac{|\Omega \cap \text{Min}_s|}{s}$ EstimateSum
Input: sketches $H$, user $u$, user $v$, constraints $\Omega$
1: $\text{sum}_v = 0$
2: for $k = 1$ to $r_{max}$ do
3:   $\text{sum}_v \mathrel{+}= \text{MinWiseEstimate}(H_u^k, H_v^1, \Omega)$
4: return $\text{sum}_v$ EstimateInnerProduct
Input: users $u, v$, sketches $H$, constraints $\Omega$
1: $ip = 0$
2: for $k = 1$ to $r_{max}$ do
3:   for $\ell = 1$ to $r_{max}$ do
4:     $ip \mathrel{+}= \text{MinWiseEstimate}(H_u^k, H_v^\ell, \Omega)$
5: return $ip$ EstimateCosine
Input: users $u, v$, sketches $H$, constraints $\Omega$, norms norms
1: $ip = \text{EstimateInnerProduct}(u, v, H, \Omega)$
2: return $ip/\sqrt{N[u]N[v]}$ EstimatePearson
Input: users $u, v$, sketches $H$, constraints $\Omega$, norms norms
1: $ip = \text{EstimateInnerProduct}(u, v, H, \Omega)$
2: $\#\text{entries}_{uv} = \text{MinWiseEstimate}(H_u^1, H_v^1, \Omega)$
3: $\text{sum}_v^u = \text{EstimateSum}(H, u, v, \Omega)$
4: $\text{sum}_u^v = \text{EstimateSum}(H, v, u, \Omega)$
5: $m_u = S[u]/C[u]$, $m_v = S[v]/C[v]$
6: $\text{norms}_u = N[u] - 2m_u S[u] + C[u]m_u^2$
7: $\text{norms}_v = N[v] - 2m_v S[v] + C[v]m_v^2$
8: $ip \mathrel{-}= m_v \text{sum}_v^u + m_u \text{sum}_u^v - \#\text{entries}_{uv} m_u m_v$
9: return $ip/\sqrt{\text{norms}_u \text{norms}_v}$

Fig. 3

WEIGHTED SIMILARITY ESTIMATION IN DATA STREAMS WITH APPLICATIONS TO COLLABORATIVE FILTERING AND VIRAL MARKETING

CROSS-REFERENCE TO PRIOR APPLICATION

Priority is claimed to U.S. Provisional Patent Application Ser. No. 62/158,638, filed on May 8, 2015, the entire disclosure of which is hereby incorporated by reference herein.

FIELD

The present invention relates to a scalable system and method for weighted similarity estimation in massive datasets with applications to collaborative filtering and viral marketing.

BACKGROUND

According to the Blue research study 82% of users indicate that they would consider trying a new product if someone in their social network recommended it. However, this is complicated by the volume of data users generate; for example, users upload 100 hours of video to YouTube™ every 60 seconds and share more than 4.75 billion pieces of content on Facebook™ every 24 hours.

Determining the propagation of influence in online networks plays a significant role in numerous applications, ranging from collaborative filtering and viral marketing to anomaly detection. The accurate detection of influential nodes in large real-world data streams requires the efficient computation of the similarity between high numbers of pairs of objects, which can clearly be a limiting factor in computing.

Kempe et al., (D. Kempe, J. M. Kleinberg, E. Tardos. Maximizing the spread of inuence through a social network. KDD 2003: 137-146), presented a mathematical formalization of the problem of viral marketing in social networks, with the independent cascade model which assumes that a user influences each of her neighbors in the network with a certain probability. The authors presented approximation algorithms for influence maximization in the network, i.e., find a small number of users to target in the advertisement campaign in order to maximize the spread of influence. A user u influences a neighbor of hers V with a certain propagation probability $p_{u,v}$. It is assumed that propagation probabilities $p_{u,v}$ are known in advance. In a recent work, Goyal et al., (A. Goyal, F. Bonchi, L. V. S. Lakshmanan. Learning influence probabilities in social networks. WSDM 2010: 241-250), have addressed the problem of learning the influence probabilities from data for different similarity measures.

Current stream summarization approaches such as AMS (Alon Matias Szegedy) sketching ignore time constraints or they only consider binary data. Therefore being able to analyze and derive meaningful relations from the large data and in a timely/scalable manner, within reasonable computing limits, remains a problem today.

SUMMARY

An embodiment of the present invention provides a method for estimating similarities in data streams. A data source receives input vectors from users. The input vectors are enriched with meta-information, e.g., timestamps. A sketch feature generator converts the input vectors into sketch feature vectors corresponding to the users, wherein each sketch feature vector represents data and meta-information from each user received in a most recent sample period. A similarity comparator compares each sketch feature vector against other sketch feature vectors to calculate similarity probabilities between the users, using the meta-information stored in each sketch. A processor running a decision loop generates a prediction result for at least one user based on the similarity probabilities.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 shows an exemplary pseudocode for the data analysis approach according to an embodiment of the present invention.

DETAILED DESCRIPTION

The system according to an embodiment, compared to current state-of-the-art systems, models weighted similarity measures for influence propagation, and learns influence probabilities in streams, in an online fashion. Furthermore, weighted similarity measures are extended for applications, such as detecting influential users in online.

Figure 1:
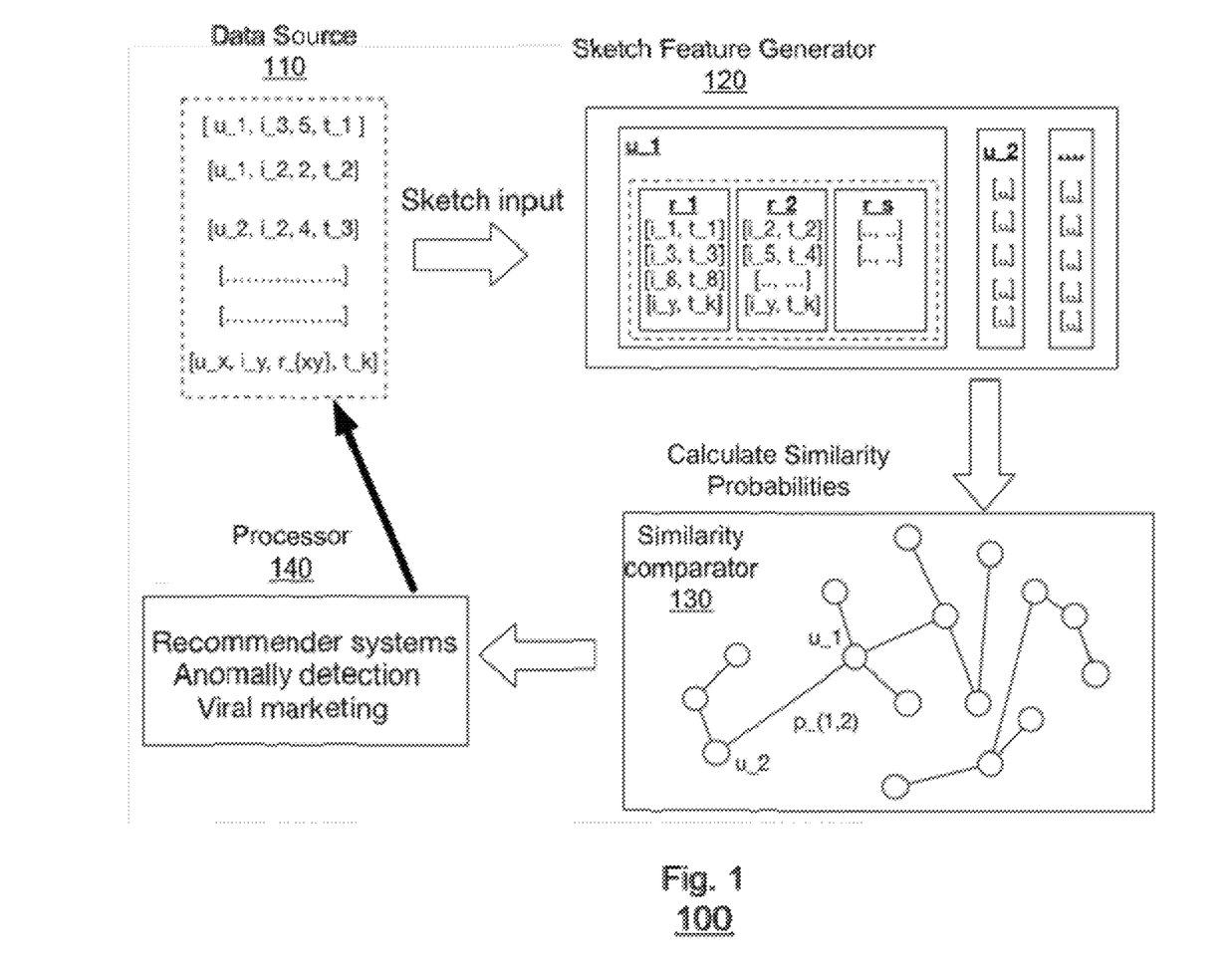
FIG. 1 shows a system for data analysis according to an embodiment of the present invention.

FIG. 1 schematically shows an exemplary system according to an embodiment of the invention. The system can be made up of a computer or computational processing unit, a server or a network of computers and/or servers, which apply the sketching algorithm to preferably streaming data from a data source 110, which is, for example, stored on or available via a network.

According to an embodiment, the data mining function with sketch generation is implemented via a method. The method includes receiving, by a data source 110, various data from users, such as in the form of vectors ([u_1, i_3, 5, t_1] . . . , where u_1 denotes user #1, i_3 denotes item #3, "5" denotes a rating of 5 from user #1, t_1 denotes timestamp #1). The timestamp information may be considered as a meta-information of the input data from the user. Other types of meta-information useable in embodiments of the present invention include geographic locations of a user, gender or item information such as version, age, history, language, etc. The sketch feature generator 120 converts the data from the users into sketch feature vectors each corresponding to one of the users, where each sketch feature vector represents data from each corresponding user received in a most recent sample period of the data source 110. The similarity comparator 130 performs similarity comparison and/or matching on each sketch feature vector against other sketch feature vectors to calculate similarity probabilities. The processor 140 running a decision loop generates a prediction result for the users based on the similarity probabilities.

According to an embodiment, a system 100 includes a data source 110, a sketch feature generator 120, a similarity comparator 130, and a processor 140 running a decision loop. The data source 110 is configured to receive various data from users, such as in the form of vectors ([u_1, i_3, 5, t_1] . . . , where u_1 denotes user #1, i_3 denotes item #3, "5" denotes a rating of 5 from user #1, t_1 denotes meta-information/timestamp #1). The sketch feature generator 120 is configured to convert the data from the users into sketch feature vectors each corresponding to one of the users, where each sketch feature vector represents data from each corresponding user received in a most recent sample period of the data source 110. The similarity comparator 130 is configured to perform similarity comparison and/or matching on each sketch feature vector against another sketch feature vector to calculate similarity probabilities. The processor 140 running a decision loop is configured to generate a prediction result for the users based on the similarity probabilities.

According to an embodiment, the data source 110 may be implemented via a database stored on a server, or a real time data collection device. The sketch feature generator 120, the similarity comparator 130, and the processor 140 may be each implemented via a computer or computational processing unit executing software stored on non-transitory computer readable medium, or via a firmware or a hardware circuitry configured to perform the algorithm functions as described herein. Additionally, the data source 110, the sketch feature generator 120, the similarity comparator 130, and the processor 140 may be implemented together as a single unit or a single device, integrated on a single semiconductor die or a single chip with multiple semiconductor dies.

According to an embodiment, the similarity comparator 130 is further configured to generate a similarity graph of the users based on the similarity probabilities.

According to an embodiment, each sketch feature vector represents user actions at multiple timestamps.

According to an embodiment, the input data are received by the data source as a stream of the input data in real time.

According to an embodiment, the sketch feature generator 120 converts the stream of the input data to update the sketch feature vectors based on an order of the stream of the input data and to remove data received outside of the most recent sample period of the data source 110.

According to an embodiment, the system 100 may include a memory that is configured to store the sketch feature vectors that are converted by the sketch feature generator 120 from the input data.

According to an embodiment, the memory is further configured to store a similarity graph of the users based on the similarity probabilities.

Similarity matching is performed on the sketch features and a decision loop is performed to evaluate similarities and provide a decision based on the similarities and the application. The application input or data depends on the application. Applications are also differentiated by the decision loop. For example, a recommender system may use as input product ratings from users, and evaluate the similarity between users purchases in order to recommend new products to users, for example of a similar group or type or in a shared social network.

Embodiments of the present application may be used in particular applications, such as viral marketing. Social media and viral marketing or word-of-mouth have been a boon for marketers. It has been estimated that a successful viral campaign can have 500-1000 times more impact than a non-viral campaign. Viral marketing relies on the concept that influence propagates through the network and the basic assumption is that, when users see their social contacts performing an action that they are more likely to perform the action themselves.

An embodiment of the present invention relates to recommender systems and the use of the method therein. The increasing popularity of many on-line rating networks for movies, videos, images, and dating, such as YouTube™, Lastfm™, IMDB™, etc. presents new opportunities for identifying the similarity between users, and to recommend new interest to them. For example, users may receive from recommender systems recommendations of trending movies, videos, images, blog articles, generated from latest activities of other users with similar interests in the past.

Another embodiment of the present invention has a particular application in anomaly detection. Inferring and forecasting the behavior of a network in the presence of heterogeneous traffic is challenging. Operators can monitor and profile the evolution of their network in order to anticipate and promptly react to failure. However, the effectiveness of network behavior mining is based on accurate and real time stream analysis of big network data in order to learn hidden correlations between stream features and predicting causal relationships and influences. The present invention, in an embodiment, provides for improved computing capability, accuracy, speed and real time analysis of massive streams of data.

According to an embodiment, the k-norm of a vector $x \in R^m$ is defined as $\|x\|_k = (\Sigma_{i=1}^m |x_i|^k)^{1/k}$. The 2-norm of x will be denoted as $\|x\|$, and the 1-norm as $|x|$.

Let U be a set of m users and I a set of n items. A rating given by user $u \in U$ on an item $i \in I$ is denoted as $r_{ui}$. A user's characteristic is described by an n-dimensional real vector. For the i-th entry in u, it holds $u_i = r_{ui}$, thus $u_i$ may be used instead of $r_{ui}$ to denote u's rating on i. The set of items rated by user i is denoted by $I_u$.

Consider following similarity measures:

Cosine Similarity.

$$\cos(u, v) = \frac{\sum_{i \in I_u \cap I_v} u_i v_i}{\|u\| \|v\|} \quad (1)$$

where $\|u\| = \left(\sum_{i \in I_u} u_i^2\right)^{\frac{1}{2}}$.

Pearson Correlation.

$$\rho(u, v) = \frac{\sum_{i \in I_u \cap I_v} (u_i - \tilde{u})(v_i - \tilde{v})}{\|\tilde{u}\| \|\tilde{v}\|} \quad (2)$$

where $\tilde{u} = \frac{1}{|I_u|} \sum_{i \in I_u} u_i$, $\|\tilde{u}\| = \left(\sum_{i \in I_u} (u_i - \tilde{u})^2\right)^{\frac{1}{2}}$.

The above is extended to similarity estimation in data streams where an additional time constraint is introduced. In particular, for example:

$$\Omega(u_i, v_i) = \begin{cases} 1, & \text{if } 0 \le t(v) - t(u) \le \tau \\ 0 & \text{otherwise} \end{cases}, \quad (3)$$

where $\Omega(u_i, v_i)$ is the binary constraint that evaluates whether user v has rated items i within $\tau$ time units after the item i has been rated by user u.

Cosine similarity and Pearson correlation are extended as follows:

Cosine Similarity.

$$\cos_\Omega(u, v) = \frac{\sum_{i \in I_u \cap I_v} u_i v_i \Omega(u_i, v_i)}{\|u\| \|v\|} \quad (4)$$

Pearson Correlation.

$$\rho_\Omega(u, v) = \frac{\sum_{i \in I_u \cap I_v} (u_i - \tilde{u})(v_i - \tilde{v}) \Omega(u_i, v_i)}{\|\tilde{u}\| \|\tilde{v}\|} \quad (5)$$

STRIP (Stream Learning of Influence Probabilties) Approach

In an embodiment of the present invention, a STRIP based data analyzer is implemented.

Applying the STRIP approach, it is assumed to begin with a social graph and a stream of user-action pairs (u, $a_i$) denoting that user u performed action $a_i$. Actions can denote any activity such as liking a post, sharing a video or rating an item. For a possible set of n actions, a user's activity is represented by a (sparse) binary vector where the i-th entry denotes whether a user has performed the action $a_i$. In this context, an action corresponds to rating an item, and the exact ratings are not of interest, except in the fact that the item was rated. The goal is to detect users that appear to have high influence on their neighbors. Since only items which a user has rated is of interest, it can be assumed that the items rated by user u correspond to an n-dimensional binary vector $r^u$ such that $r_i^u = 1$ if and only if user u has rated item i. Following the definition from Equation (2), the influence probability is defined as $$p_{uv} = \frac{|A_{u2v}^\tau|}{|A_{u|v}|} \quad (6)$$

where $A_{u2v}^\tau$ is the set of actions that have propagated from u to v within $\tau$ time units, i.e., u has done the action at most T time units before v. $A_{u|v}$ is the set of actions performed by either u or v. In this setting, actions correspond to item ratings without distinguishing how the item is rated. The STRIP approach works using min-wise independent permutations for estimating $p_{uv}$.

Let h: A→[0, 1] be a random hash function that maps actions to values in the interval [0, 1]. A user-action-meta-information triple (u, $a_i$, $t_i$) is then processed as follows: For each user u, a sample $H_u$ records the k action-meta-information pairs with the smallest hash values. If $h(a_i)$ is smaller than the largest entry in $H_u$, or $H_u$ contains less than k entries, add ($a_i$, $t_i$) to $H_u$ and remove the (k+1)-th largest entry, if any. Implementing $H_u$ as a priority queue guarantees a fast update. Once the stream has been processed, the influence probability $p_{uv}$ of user u on user v is estimated as $$\frac{\Omega_\tau(H_u, H_v)}{k} \quad (7)$$

where $\Omega_\tau(H_u, H_v)$ denotes the set of actions in both $H_u$ and $H_v$ which satisfy the time constraint $\Omega$.

Now, in an embodiment of the present invention, it is assumed that ratings are small integer numbers. Clearly, such an assumption is justified in practice, since in many applications, users usually rate items on a 5- or 10-scale. The STRIP approach is extended to handle weighted similarity measures by treating each rating as being composed by $r_{max}$ binary ratings, $r_{max}$ being the maximum rating. More precisely, a rating $r_u$ can be expressed as $r^u = \sum_{k=1}^{r_{max}} c_i^u$, where $c_i^u \in \{0, 1\}$. The product of two ratings $r^u$, $r^v$ can thus be written as $$r^u r^v = \sum_{k=1}^{r_{max}} c_k^u \sum_{k=1}^{r_{max}} c_k^v = \sum_{k=1}^{r_{max}} \sum_{l=1}^{r_{max}} c_k^u c_l^v. \quad (8)$$

For example, let $r^u = 1$, $r^v = 3$ and $r_{max} = 3$. Then, $r_u = 1+0+0$, $r_v = 1+1+1$ and $r^u r^v = (1 \times 1 + 1 \times 1 + 1 \times 1) + (0 \times 1 + 0 \times 1 + 0 \times 1) + (0 \times 1 + 0 \times 1 + 0 \times 1)$.

Let $c_k^u \in \{0,1\}^n$ be the binary vector that corresponds to the k-th position of a user u's ratings. For example, assume n=5, $r_{max}=5$ and a user u has given following ratings: $r_{u1}=3$, $r_{u4}=5$, $r_{u5}=1$, items 2 and 3 have not been rated by u. Accordingly, $c_1^u=(1, 0, 0, 1, 1)$, $c_2^u=(1, 0, 0, 1, 0)$, $c_3^u=(1, 0, 0, 1, 0)$, $c_4^u=(0, 0, 0, 1, 0)$ and $c_5^u=(0, 0, 0, 1, 0)$. An inner product uv can be rewritten as the sum of $r_{max}^2$ inner products of binary vectors:

$$uv = \sum_{i=1}^{n} u_i v_i = \sum_{i=1}^{n} \sum_{k=1}^{r_{max}} c_k^{u_i} \sum_{l=1}^{r_{max}} c_l^{v_i} \quad (9)$$

$$= \sum_{k=1}^{r_{max}} \sum_{l=1}^{r_{max}} \sum_{i=1}^{n} c_k^{u_i} c_l^{v_i} = \sum_{k=1}^{r_{max}} \sum_{l=1}^{r_{max}} c_k^u c_l^v.$$

The above is used in an embodiment of the present invention as follows. For each user, $r_{max}$ sketches are maintained. Thus, for each user, $r_{max}$ separate binary substreams can be considered. For each such stream, the STRIP approach can be run and a min-wise independent sample can be maintained. Let (u, $r_i^u$, $t_{ui}$) be an incoming user-rating-meta-information triple. All user u's k-th min-wise sample may be updated, $1 \le k \le r_{max}$, if and only if $r_{ui} \le k$. Once the stream has been processed, the inner product $uv_{\Omega(\tau)}$ can be estimated as $\sum_{k=1}^{r_{max}} \sum_{l=1}^{r_{max}} \text{est}(c_k^u c_l^v{}_{\Omega(\tau)})$, where $\text{est}(c_k^u c_l^v{}_{\Omega(\tau)})$ is the estimated constrained inner product of the binary vectors $c_k^u$ and $c_l^v$.

FIG. 3 shows an exemplary pseudocode for the data analysis approach according to an embodiment of the present invention.

Pearson Correlation

An estimation of $uv_\Omega$ results in an estimation of $\cos \Omega(u,v)$. However, for Pearson correlation, an estimate of $(u-\tilde{u})(v-\tilde{v})_\Omega$ is needed. Let $\text{sum}_{\Omega(u,v)}^u = \sum_{i \in I:\Omega(u_i, v_i)} u_i$ and $\text{nnz}_{\Omega(u,v)} = \sum_{i \in I:\Omega(u_i,v_i)} 1$. By rewriting the inner product, $(u-\tilde{u})(v-\tilde{v})_\Omega = uv_\Omega - \tilde{u} \text{sum}_{\Omega(u,v)}^v - \tilde{v} \text{sum}_{\Omega(u,v)}^u + \text{nnz}_{\Omega(u,v)} \tilde{u} \tilde{v}$ is obtained. $\text{sum}_{\Omega(u,v)}^u$, $\text{sum}_{\Omega(u,v)}^v$ and the number of nonzero entries in $uv_{106}$ are estimated. And $\Sigma_{i=1}^{n} \text{sum}_{k=1}^{r_{max}} c_k^u c_l^v {}_{\Omega(u,v)}$ is rewritten for the Pearson correlation based on the above. This can be easily verified: consider exactly those u for which $\Omega(u_i, v_i)$ and for each of them, add up exactly $u_i$ 1's, it can be observed that the number of nonzero entries in $uv_\Omega$ is exactly the number of indices i for which $\Omega(u_i, v_i)$, i.e., $c_1^u c_1^v$.

Lemma 1. Let $z \geq 0$, $x \geq 1$ and $0 < \varepsilon < \frac{1}{2}$. Then $$\frac{z}{x+\varepsilon} \geq (1-\varepsilon)\frac{z}{x} \text{ and } \frac{z}{x-\varepsilon} \leq (1+2\varepsilon)\frac{z}{x}.$$

For $\varepsilon > 0$, it holds that $$\frac{z}{x+\varepsilon} \geq \frac{z}{(1+\varepsilon)x} = \frac{z}{x} - \frac{\varepsilon z}{(1+\varepsilon)x} \geq \frac{z}{x} - \frac{\varepsilon z}{x} = \frac{(1-\varepsilon)z}{x}.$$

Similarly, for $\varepsilon < \frac{1}{2}$, it holds that $$\frac{z}{x-\varepsilon} \leq \frac{z}{(1-\varepsilon)x} = \frac{z}{x} + \frac{\varepsilon z}{(1-\varepsilon)x} \leq \frac{z}{x} + \frac{2\varepsilon z}{x} = \frac{(1+\varepsilon)z}{x}.$$

Theorem 3. Let S be a stream of vector entries $u_i$, $1 \leq i \leq m$ arriving in arbitrary order for n different m-dimensional vectors. Let $u_i \leq r_{max}$ for all vector entries. There exists a one-pass algorithm that computes a sketch of the user activity using $$O\left(\frac{r_{max}}{\varepsilon^2}\right)$$

space per user and $$O\left(r_{max} \log^2\left(\frac{1}{\varepsilon}\right)\right)$$

processing time per pair. For a vector pair u, $v \in R^m$, after preprocessing the sketches of u, v in time $$O\left(r_{max} \log^2\left(\frac{1}{\varepsilon}\right)\right)$$

we can obtain an $\varepsilon r_{max}(|u|+|v|)$-approximation of the inner product uv with probability $\frac{2}{3}$ in time $$O\left(\frac{r_{max}^2}{\varepsilon^2}\right).$$

Consider an incoming entry $u_i$. All $\text{Hash}_u^k$ are updated for which it holds $u_i \geq k$. In $\text{Hash}_u^k$, the s pairs $(c_l^{u_i}, h(i))$ are kept with smallest hash values. Under the assumption that h is injective, the s pairs are well-defined. Assume that h is implemented as $(1-c, s)$-min-wise independent function, thus h(i) can be stored in space O(s) and evaluated in time $O(\log^2 s)$. Implementing $H_u$ as a priority queue, the total processing time is $O(u_{max} \log^2 s)$.

Let $A, B \subseteq [n]$ be two subsets. Let $a = J(A,B)$ denote the Jaccard similarity between A and B. Let $\min_s^h(A \cup B)$ denote the s smallest elements in $A \cup B$ under h. Let X be a random variable counting the number of attributes from $A \cap B$ in $\min_s^h(A \cup B)$. It holds that $E[X] = \alpha s$. The number of attributes from $A \cap B$ in size-s subsets follow hyperoeometric distribution with s samples from a set of size n and $\alpha n$ successes. Thus, for $$s > 1, V[X] = \frac{\alpha(1-\alpha)s(n-s)}{n-1} < \alpha s.$$

By Chebyshev's inequality, $$\Pr[|Z - E[X]|] \geq \varepsilon s] \leq \frac{V(X)}{\varepsilon^2 s^2} < \frac{\alpha}{\varepsilon^2 s}.$$

For $s = O(1/\varepsilon^2)$, the probability is bound to 1/c for arbitrary fixed c. For h being $(1/(c+1), k)$-wise independent, $\varepsilon$-approximation of a for $s = O(1/\varepsilon^2)$ can be obtained.

An approximation of $|A \cup B|$ is obtained as follows. It holds $$\alpha = \frac{|A \cap B|}{|A \cup B|} = \frac{|A \cap B|}{|A| + |B| - |A \cap B|}. \text{ Thus, } |A \cap B| = \frac{\alpha(|A|+|B|)}{1+\alpha}.$$

Consider an $\varepsilon$-approximation of a. For the approximation error of $|A \cap B|$, it is obtained $$\frac{(\alpha \pm \varepsilon)(|A|+|B|)}{1+\alpha \pm \varepsilon} = \frac{\alpha(|A|+|B|)}{1+\alpha \pm \varepsilon} \pm \frac{\varepsilon(|A|+|B|)}{1+\alpha \pm \varepsilon}.$$

By Lemma 1 and using $\alpha \in [0,1]$, the approximation error is bound by $O(\varepsilon(|A|+|B|))$.

The total approximation error for estimating an inner product uv is then bounded by $\Sigma_{k=1}^{r_{max}} \Sigma_{l=1}^{r_{max}} c_k^u c_l^v \pm \varepsilon(|c_k^u|+|c_l^v|) = uv \pm \varepsilon(\Sigma_{l=1}^{r_{max}} \Sigma_{k=1}^{r_{max}} |c_k^u| + \Sigma_{k=1}^{r_{max}} \Sigma_{l=1}^{r_{max}} |c_l^v|) = uv \pm \varepsilon r_{max}(|u|+|v|)$.

The s smallest elements in the intersection of two sets with O(s) elements each can be found in O(s) time after presorting the sets in time $O(s \log s)$. Thus, from the sketches $H_u$ and $H_v$, the inner product uv can be estimated in time $$O\left(\frac{r_{max}^2}{\varepsilon^2}\right).$$

Theorem 4. Let S be a stream of vector entry-meta-information pairs $(u_i, t_{ui})$ such that $u_i \leq r_{max}$ for all vector entries. There exists a one-pass algorithm that computes a sketch of each $u \in U$ using $$O\left(\frac{r_{max}^2}{\varepsilon^2}\right)$$

space per user and $O(r_{max} \log 1/\varepsilon)$ processing time per pair. Let $\Omega$ be an appropriately defined time constraint. For any two users u, $v \in U$, from the sketches of u and u, an $\varepsilon(|u|+|v|)$-approximation of the inner product $uv_\Omega$ can be obtained with probability $\frac{2}{3}$.

Consider the estimation of the time constrained inner product of two binary vectors $c_k c_{l_\Omega}$. As similar to Theorem 3 above, consider two sets A, B and apply minwise independent hashing in order to estimate $$\alpha_\Omega = \frac{|A \cap B|\Omega}{|A \cup B|}.$$

Let $$\alpha = \frac{|A \cap B|}{|A \cup B|}.$$

As similar for Theorem 3, an ε-approximation of $\alpha_\Omega$ can be obtained using $$O\left(\frac{1}{\varepsilon^2}\right)$$

space and $O(\log^2 1/\varepsilon)$ processing time.

Assume an $\varepsilon(|A|+|B|)$-approximation of $|A \cap B|$ is computed using $$O\left(\frac{1}{\varepsilon^2}\right)$$

space and $O(\log^1 1/\varepsilon)$ processing time. It holds that $|A \cap B|\Omega = \alpha_\Omega |A \cup B| = \alpha_\Omega(|A|+|B|-|A \cap B|)$. The approximation error can be bound to $O(\varepsilon(|A|+|B|))$.

Using a sketch of size $$\left(\frac{1}{\varepsilon^2}\right),$$

Theorems 3 and 4 above yield following approximation guarantees for the considered similarity measures.

Corollary 1. Let $u, v \in N^m$ be revealed in a streaming fashion. Let $u_i, v_i \leq r_{max}$. After processing the stream using $O(\log^2 1/\varepsilon)$ processing time per entry update, a sketch for each vector of space $$\left(\frac{r_{max}^2}{\varepsilon^2}\right).$$

After preprocessing each sketches in time $$O\left(\frac{r_{max}^2}{\varepsilon^2}\log\left(\frac{1}{\varepsilon}\right)\right),$$

$\varepsilon r_{max} \cos(u,v)$-approximation in time $$O\left(\frac{r_{max}^2}{\varepsilon^2}\right).$$

For $u, v \in N^m$, it holds that $$|u|+|v| = \Sigma_{i=1}^m {}^i u_i + v_i \leq 2 \Sigma_{i=1}^m \max(u_i, v_i) \leq 2 \Sigma_{i=1}^m u_i v_i = 2uv.$$

The last inequality follows from $u_i, v_i \geq 1$. Thus, for $$q \geq uv - \varepsilon r_{max}(|u|+|v|),$$

$$\frac{q}{\|u\|\|v\|} \geq \frac{uv - \varepsilon r_{max}(|u|+|v|)}{\|u\|\|v\|} \geq \frac{(1-2\varepsilon r_{max})uv}{\|u\|\|v\|} = (1-2\varepsilon r_{max})\cos(u,v)$$

can be obtained.

Similarly, for $$q \geq uv + \varepsilon r_{max}(|u|+|v|),$$

$$\frac{q}{\|u\|\|v\|} \leq (1+2\varepsilon r_{max})\cos(u,v)$$

can be obtained.

Rescaling ε, the claimed bound for cosine similarity can be obtained.

As shown above for Theorem 3, an $\varepsilon(|c_1^u + c_1^v|)$-approximation of the inner product $c_i^u c_{1\Omega}^v \leq uv_\Omega$, and an $\varepsilon r_{max}(c_1^u + |v|)$-approximation of $c_1^u \Sigma_{k=1}^n c_k^v \leq uv$ can be obtained, within the claimed time and space bounds. Since $|c_1^u| \leq |u|$ for any $u \in N^m$, we obtain an $O(\varepsilon r_{max}(|u|+|v|))$-approximation of $(u-\bar{u})(v-\bar{v})_\Omega$. Dividing by $\|u\| \|v\|$ yields the claimed approximation bounds.

Experimental Evaluation

An evaluation of the methods presented above has been made using the two publicly available datasets detailed in Table 1. Both data sets are used since they contain data from social networks with links and ratings, in this case for movies.

TABLE 1

| Source | #users | #items | #ratings |
|---|---|---|---|
| MovieLens ™ | 71,567 | 10,681 | 10M |
| Flixster ™ | 1M | 49000 | 8.2M |

Evaluation Datasets. Both Ratings Sets are for Movies, and in 5-Star-Scale with Half-Star Increments Data pre-processing: For both datasets, the ratings are discretized to be in a 5-star scale using ceiling $r_{ui}$ to $\lceil r_{ui} \rceil$. After sketching the activity for each user, only user data for users that have rated at least 1,000 movies are considered. The pre-processed MovieLens™ and Flixster™ datasets consist of 840 users—1,204,445 movies, and 1,231 users—2,050,059 ratings, respectively.

Evaluation Metrics: For the quality of approximation, it is reported i) the average approximation error (aae):

$$\sum_{i=1}^n \frac{|r_i - \tilde{r}_i|}{n},$$

where $\tilde{r}$ is the approximated value of a rating r, and ii) the quality of approximation, given an approximation parameter ε, in terms of the number of estimates $\tilde{r}_i$ that are within $[r_i - \varepsilon, r_i + \varepsilon]$ (denoted as 1-dev), and within $[r_i - 2\varepsilon, r_i - 2\varepsilon]$ (2-dev).

For all experiments, 1-dev and 2-dev were computed with respect to $\varepsilon=1/\sqrt{s}$. For example, for a sketch size s=400, $\varepsilon=0.05$.

For the scalability of the algorithms, the memory requirements are reported in terms of the sketch size (s) used, i.e., the number of entries stored in the sketch. Using a sketch size of s means that the total space is 5×s.

Influence Propagation Probability Estimation

The influence propagation method discussed above is evaluated on the two data sets, and the influence probability between users was tracked for a period of 6 months. Because the social graph of the Flixster™ network is very sparse, to demonstrate statistical significance, the density of links was increased. This was achieved by adding a new link between a pair of users u and v if $d(u) \cdot d(v) \geq 1/r$ for a random number in (0, 1], where d (u) is the number of neighbors of user u in the network.

Table 2 reports approximation error when varying the sketch size (s). Surprisingly, very precise estimates are observed for cosine similarity for both datasets; Table 2a for MovieLens™ and Table 2b for Flixster™. With respect to the datasets considered in this embodiment, space savings are provided by smaller sketch sizes. For example, for a sketch size of 200 and ratings on a 5-scale, in the MovieLens™ dataset, 840,000 samples need to be stored, while for Flixster™, more than 1.2 million samples need to be stored. For reference, the pre-processed MovieLens™ and Flixster™ datasets contain 1,204,445 and 2,050,059 ratings respectively.

TABLE 2(a)

Quality of approximation of the influence probability for varying sketch size for the MovieLens™ dataset

| | Cosine | | | Pearson | | |
|---|---|---|---|---|---|---|
| s | aae | 1-dev | 2-dev | aae | 1-dev | 2-dev |
| 50 | 0.0562 | 0.9347 | 0.999 | 0.0842 | 0.8207 | 0.9767 |
| 100 | 0.0394 | 0.9341 | 0.9981 | 0.0711 | 0.748 | 0.9563 |
| 150 | 0.0271 | 0.967 | 0.9995 | 0.0489 | 0.8206 | 0.991 |
| 200 | 0.0243 | 0.9565 | 0.9987 | 0.0439 | 0.8036 | 0.9735 |
| 250 | 0.0256 | 0.9159 | 0.9924 | 0.0431 | 0.7698 | 0.9595 |
| 300 | 0.0201 | 0.9508 | 0.9975 | 0.0428 | 0.7264 | 0.9536 |
| 350 | 0.0227 | 0.8938 | 0.9826 | 0.0369 | 0.7815 | 0.9658 |
| 400 | 0.0183 | 0.9367 | 0.994 | 0.0331 | 0.779 | 0.9742 |

TABLE 2(b)

Quality of approximation of the influence probability for varying sketch size for the Flixster™ dataset.

| | Cosine | | | Pearson | | |
|---|---|---|---|---|---|---|
| s | aae | 1-dev | 2-dev | aae | 1-dev | 2-dev |
| 50 | 0.0453 | 0.9794 | 0.9992 | 0.109 | 0.7194 | 0.9387 |
| 100 | 0.0394 | 0.9398 | 0.9991 | 0.0867 | 0.6644 | 0.9187 |
| 150 | 0.0365 | 0.9432 | 0.9868 | 0.0586 | 0.7551 | 0.9633 |
| 200 | 0.033 | 0.8911 | 0.9964 | 0.0508 | 0.7592 | 0.9529 |
| 250 | 0.0291 | 0.9154 | 0.9957 | 0.0448 | 0.7439 | 0.9727 |
| 300 | 0.0254 | 0.9091 | 0.9967 | 0.0419 | 0.7139 | 0.9384 |
| 350 | 0.0245 | 0.8861 | 0.9952 | 0.0408 | 0.6926 | 0.92658 |
| 400 | 0.0241 | 0.8824 | 0.994 | 0.0395 | 0.6319 | 0.8995 |

Figure 2:
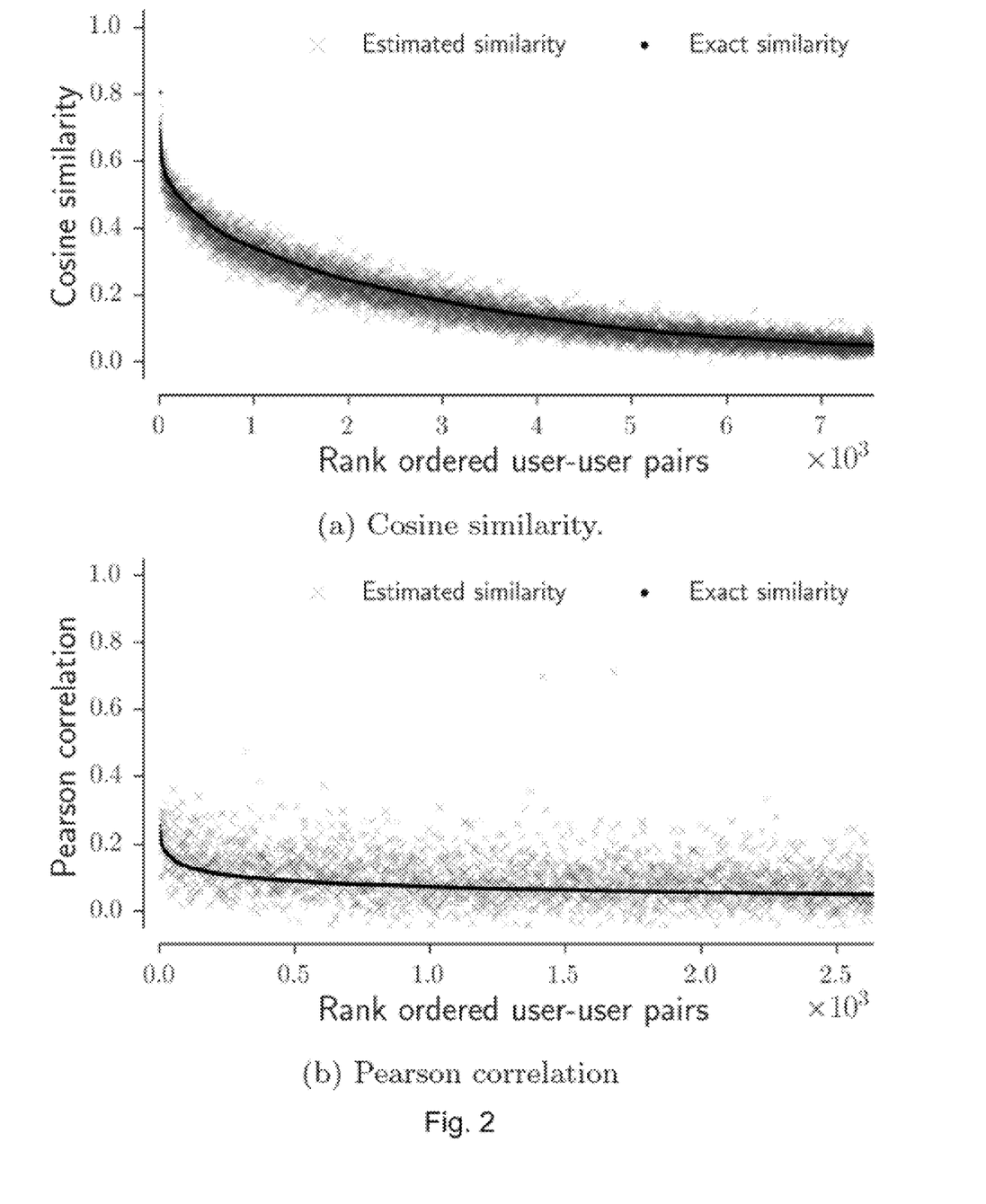
FIG. 2 shows the quality of similarity results of the data analysis approach on a Flixster™ dataset according to an embodiment of the present invention, for users with more than 1000 ratings. Sketch=200, T=6 months.

FIG. 2 shows the quality of similarity results of the data analysis approach on a Flixster™ dataset according to an embodiment of the present invention, for users with more than 1000 ratings. Sketch=200, T=6 months.

Embodiments of the invention advantageously provide, for example:
An extension of widely used weighted similarity measures to also considers time constraints, enabling the modeling of influence probabilities.
A novel scalable algorithm for handling the above weighted similarity measures in data streams.
Application to the modeling of influence probabilities in networks.
Learning of influence probabilities in streams, in an online fashion. Previous work assumes that influence probabilities are known apriori or can be efficiently computed online.

An embodiment of the method for learning influence probabilities via weighted similarity metrics from data streams and detecting influential users in online fashion, may include:
1. Collecting feature vectors.
2. Defining a suitable similarity measure and a corresponding time threshold.
3. Implementing a system for processing the feature vectors in a streaming fashion. This consists of following steps:
   (a) Define a hash function $h: I \to I$ that will simulate min-wise independent permutations.
   (b) For each rating rui in the stream, update u's sketch for each position using h.
   (c) After processing the stream, estimate the similarity for a pair of users u, v from the sketches of u and v.
   (d) Build a weighted graph from the estimated propagation probabilities. (This is application dependent, sometimes social links may be given or created when the similarity is above certain threshold.)
   (e) Run application on the weighted graph, for example the influence maximization algorithm.

The algorithm is particularly suitable for large input vectors with entries from a small discrete domain, having a particular application in rating social networks. However, if vectors are allowed to have more distinct values, the algorithm can become impractical. In such situations, the original vectors can be discretized to have a small number of different values, though this will lead to some additional loss of accuracy.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for estimating similarities in data streams, comprising:

receiving, from a data source, a plurality of input vectors from a plurality of users;

converting, by a sketch feature generator, the plurality of input vectors into a plurality of sketch feature vectors each corresponding to one of the plurality of users, wherein each of the plurality of sketch feature vectors represent data and meta-information from each corresponding one of the plurality of users received in a most recent sample period of the data source, wherein $r_{max}$ sketch feature vectors are maintained for each of the plurality of users, $r_{max}$ being a maximum rating, and wherein a min-wise independent sample is maintained for each of the sketch feature vectors, the min-wise independent samples being updated in each case based on a new input vector being received for a respective one of the plurality of users;

comparing, by a similarity comparator, each of the plurality of sketch feature vectors against one or more of other ones of the plurality of sketch feature vectors so as to calculate a plurality of similarity probabilities; and generating, by a processor running a decision loop, a prediction result for at least one of the plurality of users based on the plurality of similarity probabilities.

2. The method according to claim 1, further comprising generating a similarity graph of the plurality of users based on the plurality of similarity probabilities.

3. The method according to claim 1, wherein each of the plurality of sketch feature vectors represents a plurality of user actions at a plurality of timestamps.

4. The method according to claim 3, wherein the user actions include user ratings for generating the prediction result as a recommendation.

5. The method according to claim 1, wherein the plurality of input vectors is received by the data source as a stream of the input vectors in real time.

6. The method according to claim 5, wherein the sketch feature generator converts the stream of the input vectors to update the plurality of sketch feature vectors based on an order of the stream of the input vectors and to remove data received outside of the most recent sample period of the data source.

7. The method according to claim 6, further comprising storing, by a memory, a similarity graph of the plurality of users based on the plurality of similarity probabilities.

8. The method according to claim 1, wherein the new input vector received for the respective one of the plurality of users is a user-rating-timestamp triple (u, tui), and wherein a k-th one of the min-wise independent samples of the respective one of the plurality of users is updated if and only if $r_{ui}$ is less than or equal to k.

9. The method according to claim 8, wherein a similarity between the respective one of the plurality of users and another one of the plurality of users is based on a sum of $r_{max}^2$ inner products of the sketch feature vectors representing the new input vector.

10. The system according to claim 1, wherein the new input vector received for the respective one of the plurality of users is a user-rating-timestamp triple $(u, r_{ui}, t_{ui})$, wherein the sketch feature generator is configured to update a k-th one of the min-wise independent samples of the respective one of the plurality of users if and only if $r_{ui}$ is less than or equal to k.

11. The system according to claim 10, wherein the similarity comparator is configured to compute a similarity between the respective one of the plurality of users and another one of the plurality of users which is based on a sum of $r_{max}^2$ inner products of the sketch feature vectors representing the new input vector.

12. A system for data mining, comprising:

a data source configured to receive a plurality of input vectors from a plurality of users;

a sketch feature generator configured to convert the plurality of input vectors into a plurality of sketch feature vectors each corresponding to one of the plurality of users, wherein each of the plurality of sketch feature vectors represent data and meta-information from each corresponding one of the plurality of users received in a most recent sample period of the data source, wherein $r_{max}$ sketch feature vectors are maintained for each of the plurality of users, $r_{max}$ being a maximum rating, and wherein a min-wise independent sample is maintained for each of the sketch feature vectors, the min-wise independent samples being updated in each case based on a new input vector being received for a respective one of the plurality of users;

a similarity comparator configured to compare each of the plurality of sketch feature vectors against one or more of other ones of the plurality of sketch feature vectors so as to calculate a plurality of similarity probabilities; and a processor running a decision loop configured to generate a prediction result for at least one of the plurality of users based on the plurality of similarity probabilities.

13. The system according to claim 12, wherein the similarity comparator is further configured to generate a similarity graph of the plurality of users based on the plurality of similarity probabilities.

14. The system according to claim 12, wherein each of the plurality of sketch feature vectors represents a plurality of user actions at a plurality of timestamps.

15. The system according to claim 14, wherein the user actions include user ratings for generating the prediction result as a recommendation.

16. The system according to claim 12, wherein the plurality of input vectors is received by the data source as a stream of the input vectors in real time.

17. The system according to claim 16, wherein the sketch feature generator converts the stream of the input vectors to update the plurality of sketch feature vectors based on an order of the stream of the input vectors and to remove data received outside of the most recent sample period of the data source.

18. The system according to claim 17, further comprising a memory configured to store the plurality of sketch feature vectors that are converted by the sketch feature generator from the plurality of input vectors.

19. The system according to claim 18, wherein the memory further stores a similarity graph of the plurality of users based on the plurality of similarity probabilities.

* * * * *